March 18, 1952 — A. E. LARSEN — 2,589,826
EPICYCLIC HELICOPTER ROTOR SYSTEM
Filed May 26, 1949 — 2 SHEETS—SHEET 2
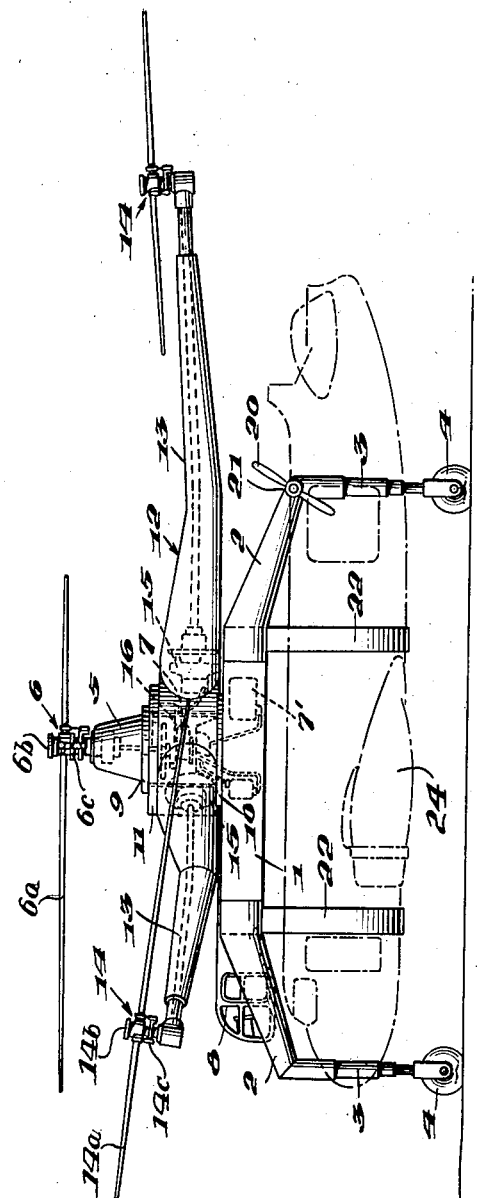
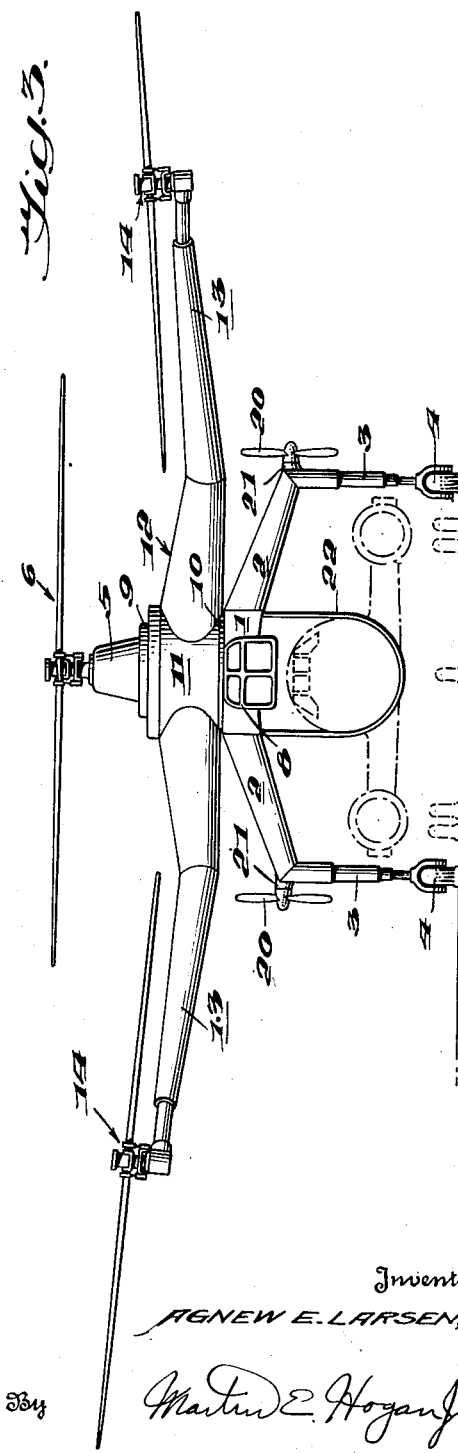
Inventor
AGNEW E. LARSEN,
By
ATTORNEY Patented Mar. 18, 1952

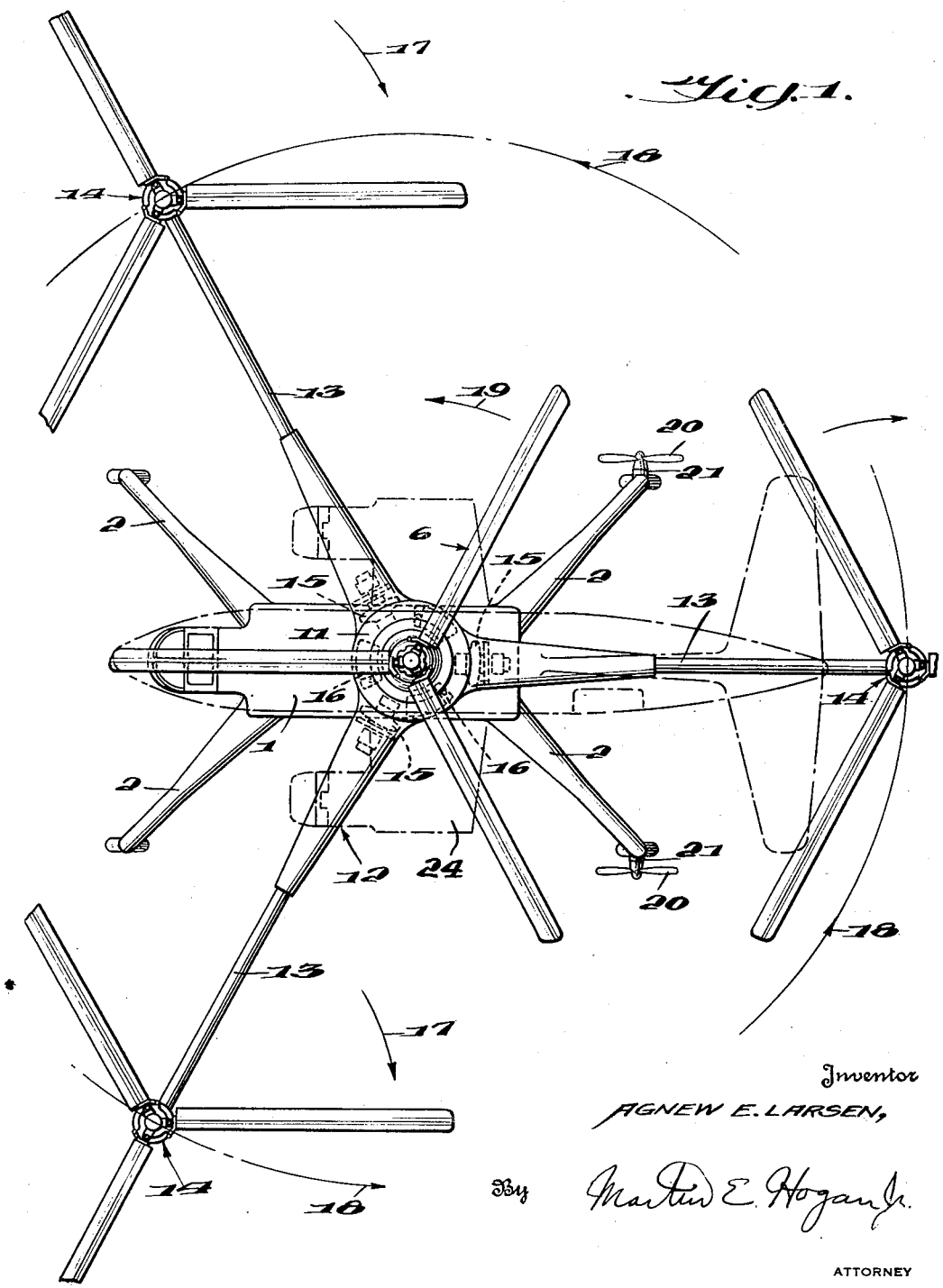

2,589,826

UNITED STATES PATENT OFFICE 2,589,826

EPICYCLIC HELICOPTER ROTOR SYSTEM

Agnew E. Larsen, New Britain, Pa., assignor to The Glenn L. Martin Company, Middle River, Md., a corporation of Maryland Application May 26, 1949, Serial No. 95,543

7 Claims. (Cl. 170—135.2)

This invention relates to an improvement in helicopters.

It is an object of this invention to provide a helicopter having a relatively large effective disc area with resulting large lift capabilities.

It is a further object to provide a helicopter in which a plurality of driven rotors are carried at the outer ends of the arms of a freely rotatable spider assembly carried by the body or fuselage, wherein the spider assembly, together with the rotors carried thereby, will itself be rotated by the reaction produced by the rotation of the driven rotors.

Another object is to provide in such a helicopter a centrally-arranged driven rotor, coaxial with the axis of rotation of the spider, whereby the rotors together provide an effective disc area whose diameter is equal to the diameter of the spider plus the diameter of one of the tip rotors.

Another object is to produce a helicopter especially designed to facilitate the lifting of relatively heavy and bulky loads.

It is a further object to provide such a helicopter wherein the body or fuselage is supported at a relatively great height above the ground by means of widely spaced supporting legs, so arranged that the helicopter may in effect straddle the load to be carried.

It is still a further object to provide in such a helicopter, means for slinging the load to be carried beneath the body of the helicopter.

Further objects and advantages will be obvious from a study of the following description and claims taken in conjunction with the accompanying drawings.

In the drawings:

Figure 1 is a top plan view of the improved helicopter.

Figure 2 is a side view of the helicopter.

Figure 3 is a front view thereof.

The helicopter of the present invention comprises a body or fuselage 1 having front and rear pairs of elongated, outwardly and downwardly extending legs 2 arranged to support the body at a relatively great height above the ground. The legs 2 incorporate the usual oleo shock struts 3 and rubber-tired landing wheels 4 at their lower ends.

Extending upwardly from the central portion of the body is a pylon 5 carrying at its upper end a lifting rotor 6 adapted to be driven from a motor 7 mounted within the hollow interior of the pylon. Rotor 6 may be of any conventional design providing for both cyclic and collective pitch control of the blades thereof. In such rotors the blades 6$^a$ are movably carried by the hub 6$^b$ so that the pitch thereof can be cyclically or collectively varied by means of suitable mechanism 6$^c$ incorporated in the hub and adapted to be controlled in the usual fashion from the pilot's cockpit or compartment 8 located at the forward end of the fuselage.

Mounted for rotation between upper and lower bearing portions 9 and 10 on the pylon 5 is a hub portion 11 of a spider 12, shown as having three equally-spaced, outwardly-extending arms or booms 13. Lifting rotors 14 are carried at the outer ends of arms 13 and are adapted to be driven from suitable engines 15 located within the hollow interior of the spider adjacent the hub portion 11. The rotors 14 are also of conventional design and are arranged for collective pitch control of the blades 14$^a$ thereof by means of pitch varying mechanism 14$^c$ incorporated in the hub 14$^b$ and under the control of suitable servo-mechanisms (not shown) carried in the arms 13 and remotely controllable in any desired fashion from the cockpit 8. Suitable means such as slip rings (not shown) are of course provided for conducting the control elements for the servo-mechanisms past the rotating hub of the spider. Gas tanks and any other auxiliary equipment needed for the engines 15 are carried within the spider as indicated at 16. Similarly, gas and oil tanks etc. for the motor 7 are mounted within the pylon and fuselage as indicated at 7'.

The tip rotors 14 are arranged to be driven in the direction of rotation shown by the arrows 17 in Figure 1. As a result of such rotation, there will be produced a drag reaction acting against each of the blades of these rotors. Since the drag reaction on the blade, which at any particular time extends outwardly from the center of the spider, is further removed from the center of the spider than the drag reaction against the blades directed toward the center of the spider at that time, there will be produced a resulting moment tending to rotate the spider in the reverse direction as indicated by the arrows 18. As a result, the rotors 14 will sweep through a ring-shaped area about the axis of the spider 12. The central rotor 6 provides effective lift within the area inside of this ring-shaped area, this rotor being driven in the direction of the arrow 19.

The central rotor, being driven, will produce a definite torque reaction tending to turn the fuselage in the opposite direction from the direction of rotation thereof. It is, therefore, necessary to provide for overcoming this tendency of the fuselage to turn. A certain proportion of anti-torque will be produced by the friction between the spider hub portion 11 and the bearings 9 and 10, which friction will tend to cause the fuselage to rotate in the same direction as the spider thus tending to oppose the torque produced by the central rotor. However, since this anti-torque effect may not be sufficient to entirely prevent adverse rotation of the fuselage, auxiliary variable pitch anti-torque propellers 20 are provided, carried by suitable housings 21 located as shown on the rear legs 2. These anti-torque propellers may be driven by suitable power take-off mechanisms from the engine 7, for example, and controlled in the usual fashion from the cockpit 8.

As is shown in dot-dash lines in the figures, any desired load may be slung beneath the fuselage, between the legs of the helicopter, to be carried thereby. In the drawings, this load is indicated as being the fuselage assembly 24 of a conventional airplane. The load is adapted to be supported from the fuselage of the helicopter by means of lifting straps 22, adapted to be attached to the load. Suitable means (not shown) are provided within the fuselage for drawing in on the straps to firmly bind the load to the underside of the helicopter.

The operation of the above-described helicopter is believed to be obvious. The amount of lift and consequently the rate of climb of the helicopter will be controlled by collectively varying the pitch of the blades of both the tip rotors 14 and the auxiliary central rotor 6 in the usual manner. The direction of lateral movement will be controlled solely by the central rotor 6 which, as was above set forth, is arranged for conventional cyclic pitch control for this purpose.

With the arrangement of rotors shown and described, it will be seen that a relatively large effective disc area, the diameter of which is equal to the diameter of the spider plus the diameter of a tip rotor, is covered by the lifting blades in a most effective manner. While the individual rotors rotate at a relatively high rate of speed, they are of sufficiently small radius (compared to the radius that would be required for a single rotor to sweep a corresponding disc area) that the problems arising due to centrifugal force are to a great extent avoided. Moreover, the central area adjacent the fuselage, which in such a single-rotor helicopter would contribute relatively little lift due to the necessarily slow movement of the rotor adjacent its axis, in the instant device is acted upon by a relatively high-speed rotor and thus contributes its share to the total lift.

As a result of the novel rotor mounting arrangement, a helicopter of tremendous lifting capabilities is obtained. By providing the spaced, elongated landing gear legs as shown in the drawing in combination with this novel high lift rotor arrangement, a helicopter is produced which is ideally suited to the job of transporting heavy, bulky loads into or out of otherwise inaccessible locations. If, for example, it is desired to transport a fuselage unit as shown at 24, the helicopter may be controlled to slowly settle to the ground in position to straddle the load. The lifting straps 22 will then be attached to the load and tensioned to firmly attach the load in position and the helicopter, together with its load, flown to the desired destination.

As an example of the relative sizes involved, in a helicopter of the above-described type capable of carrying a pay load of over 10 tons, the spider arms would each extend outwardly about 55' from the spider axis and would carry at their tips, rotors of about 60' disc diameter. The central rotor would likewise be about 60' in effective diameter. With such a helicopter these rotors would be driven at about 180 to 200 R. P. M. and the thrust reaction due to the rotation of the tip rotors would produce a reverse rotation of the spider of about 20 R. P. M. The cargo clearance below the body would be in the neighborhood of 17' while the spacing between the legs would be proportioned accordingly.

While but a single form of helicopter has been shown in this application, it is believed apparent that many variations and modifications could be made without departing from the spirit and scope of the appended claims.

I claim as my invention:

1. A helicopter comprising a body, a spider mounted on the body for free rotation about a generally vertical axis, said spider having a plurality of outwardly extending arms, lifting rotors carried by the outer ends of said arms for rotation about generally vertical axes, and means carried by said spider for driving said lifting rotors, said lifting rotors being driven in the same direction of rotation whereby said spider is caused to rotate in the opposite direction, an auxiliary lifting rotor rotatably mounted on said body coaxially with said spider, and means carried by and reacting against the body for driving said auxiliary lifting rotor in the opposite direction of rotation from said rotors carried by the spider, whereby the friction forces acting between the spider and the body will tend to oppose the reaction torque transmitted to said body by said drive means for the auxiliary lifting rotor.

2. A helicopter comprising a body, a spider mounted on the body for free rotation about a generally vertical axis, said spider having a plurality of outwardly extending arms, lifting rotors carried by the outer ends of said arms for rotation about generally vertical axes, and means carried by said spider for driving said lifting rotors, said lifting rotors being driven in the same direction of rotation whereby said spider is caused to rotate in the opposite direction, an auxiliary lifting rotor rotatably mounted on said body coaxially with said spider, and means carried by and reacting against the body for driving said auxiliary lifting rotor independently of said spider.

3. A helicopter comprising a body, a spider mounted on the body for free rotation about a generally vertical axis, said spider having a plurality of outwardly extending arms, lifting rotors carried by the outer ends of said arms for rotation about generally vertical axes, means carried by said spider for driving said lifting rotors, an auxiliary rotor mounted coaxially with said spider, and means for rotating said auxiliary rotor independently of said spider.

4. A helicopter comprising a body, a spider mounted on the body for free rotation about a generally vertical axis, said spider having a plurality of outwardly extending arms, lifting rotors carried by the outer ends of said arms for rotation about generally vertical axes, and means carried by said spider for driving said lifting rotors, said lifting rotors being driven in the same direction of rotation whereby said spider is caused to rotate in the opposite direction, an auxiliary lifting rotor mounted on said body coaxially with said spider and including blades movably carried thereby for varying the pitch thereof, means carried by the body for driving said auxiliary lifting rotor, and means for cyclically varying the pitch of the blades thereof to control the lateral movement of said helicopter.

5. A helicopter comprising a body, a spider mounted on the body for free rotation about a generally vertical axis, said spider having a plurality of outwardly extending arms, lifting rotors including variable pitch blades carried by the outer ends of said arms for rotation about generally vertical axes, and means carried by said spider for driving said lifting rotors, said lifting rotors being driven in the same direction of rotation whereby said spider is caused to rotate in the opposite direction, an auxiliary lifting rotor including variable pitch blades mounted on said body coaxially with said spider for rotation about said first-mentioned axis, and means carried by the body for driving said auxiliary lifting rotor, means for cyclically varying the pitch of the blades of said auxiliary lifting rotor to control the lateral movement of said helicopter, and means for collectively varying the pitch of the blades of said first mentioned rotors to control the rate of climb of said helicopter.

6. A helicopter comprising a body, a spider mounted on the body for rotation about a generally vertical axis, said spider having a plurality of outwardly extending arms, lifting rotors carried by the outer ends of said arms for rotation about generally vertical axes, means carried by said spider for driving said lifting rotors, an auxiliary lifting rotor mounted coaxially with said spider, and means for rotating said auxiliary rotor independent of the spider.

7. A helicopter comprising a body, a spider mounted on the body for rotation about a generally vertical axis, said spider having a plurality of outwardly extending arms, lifting rotors carried by the outer ends of said arms for rotation about generally vertical axes, said lifting rotors having a radius less than the radial length of said arms, means carried by said spider for driving said lifting rotors, an auxiliary lifting rotor mounted co-axially with said spider, the radius of said auxiliary rotor being at least substantially equal to the radial length of the spider arms less the radius of said first mentioned lifting rotors, and means for rotating said auxiliary rotor independently of the spider whereby effective lift will be obtained over substantially the entire area of a circle having a diameter equal to the diameter of the spider plus the diameter of said first mentioned rotors.

AGNEW E. LARSEN.

REFERENCES CITED

The following references are of record in the file of this patent:

UNITED STATES PATENTS

| Number | Name | Date |
|---|---|---|
| D. 153,314 | Piasecki | Apr. 5, 1949 |
| 1,797,713 | Brogelli | Mar. 24, 1931 |
| 1,892,036 | Campens | Dec. 27, 1932 |
| 1,922,167 | Leray | Aug. 15, 1933 |
| 2,366,321 | Ferro | Jan. 2, 1945 |
| 2,472,947 | Hlobil | June 14, 1949 |

FOREIGN PATENTS

| Number | Country | Date |
|---|---|---|
| 581,610 | Germany | Aug. 24, 1933 |
| 586,411 | Germany | Oct. 25, 1933 |
| 366,150 | France | July 20, 1906 |
| 826,798 | France | Jan. 12, 1938 |

OTHER REFERENCES

"Aviation Week," issue of April 11, 1949, p. 24.